Dec. 27, 1966  J. B. SKAPTASON  3,294,324

FIELD SPRAYER

Filed May 10, 1965

INVENTOR
JOSEPH B. SKAPTASON
BY
Hammond & Littell
ATTORNEYS

United States Patent Office 3,294,324
Patented Dec. 27, 1966

3,294,324
FIELD SPRAYER
Joseph B. Skaptason, 12700 Prospect Ave., Rte. 30,
Kansas City, Mo. 64166
Filed May 10, 1965, Ser. No. 454,521
1 Claim. (Cl. 239—288)

The invention relates to a novel method of post-emergence spraying of beneficial crops to control or prevent the growth of undesirable weeds and to a novel agricultural spraying apparatus.

The largest limiting factor in agriculture now is adequate control of weeds in fields of beneficial crops such as cotton, soybeans, etc. Until recently, weed control was accomplished almost exclusively by mechanical cultivation between rows of crops and hand-hoeing between the individual plants in the rows. Hand-hoeing has, however become impractical since farm labor is scarce and/or is not economical due to increased wages. Therefore, farms are depending more and more upon chemical control of weeds.

Certain post-emergence herbicides are toxic to the beneficial crops as well as the weeds and must be applied with directed sprays to spray only the weeds without spraying the beneficial crops. However, preferred post-emergence herbicides are selectively toxic only to the weeds and not to the beneficial crops and are usually applied with non-directed sprays. An example of a typical non-directional field sprayer is the boom type sprayer comprised of one or more horizontal booms, usually attached to the rear of a tractor, with a single spray nozzle located over each row of crops. However, this type of field sprayer results in an erratic spray deposit with frequent over-lapping of the sprays on the beneficial crops. This spray over-lapping can result in injury to the beneficial crop due to too high a dosage of the herbicide thereon or can result in the beneficial crop absorbing so much of the herbicide as to produce a residue problem.

It is an object of the invention to provide a novel field spraying apparatus which has precision dosage control and prevents spray over-lapping on the beneficial crops.

It is another object of the invention to provide a novel post-emergence method of spraying beneficial crops with a minimum of herbicide.

It is an additional object of the invention to provide a novel post-emergence method of spraying beneficial crops which reduces or eliminates residue problems in the beneficial crop when harvested.

These and other objects and advantages of the invention will become obvious from the following detailed description.

The novel post-emergence method of the invention of spraying rows of beneficial crops with a liquid herbicide solution comprises spraying a band of the herbicide solution wider than the crop row on the beneficial crop rows and spraying bands of the herbicide solution on either side of the crop row whereby the side spray bands overlap the spray band applied to the crop row without overlapping on the beneficial crop itself.

The said method has the advantage of obtaining weed control results superior to the broadcast method while using less herbicide and is, therefore, more economical. The method applies a minimum amount of herbicide on the beneficial crop which allows its use on extremely small seedling plants and eliminates the hazard of residues on the beneficial crop when it is harvested. The method also applies a maximum amount of herbicide to the area directly adjacent to the row crop which is a very difficult and normally inaccessible area so far as mechanical cultivation is concerned, particularly as the crop grows in size. The outer portion of the side bands gives a sufficient dosage of herbicide for long term weed control and in the area where mechanical cultivation cannot be performed.

The novel field spraying apparatus of the invention for spraying beneficial row crops is comprised of a specific row applicator having a group of three spray nozzles connected to a source of spray material under pressure, the center nozzle being positioned over the row crop and the side nozzles being positioned on either side of the row crop and shielding means which prevents the spray of the side nozzles from contacting the row crop but permits overlapping of the center spray band with the side spray bands. For convenience, a series of specific row applicators can be attached to a bar and spaced according to the distance between the crop rows.

Any convenient means may be employed for conveying the spraying apparatus down the rows either individually or in groups on a bar extended transversely over the crops. For instance, the bar may be supported at either end by a set of wheels which can be self-propelled or it may be attached to a farm tractor. A preferred mode of conveying the spraying apparatus is to attach the spray bar to the hydraulic tool bar which is found on all modern tractors in front of the operator on the tractor. This arrangement allows the operator to hold the spray nozzles precisely in place, allows simple raising or lowering of the spray bar as required by the conditions and since the tool bar also supports the cultivation knives, permits simultaneous cultivation between the crop rows while spraying the field. In addition, the source of spray material can be placed on the tractor and the pump means to maintain the pressure can be attached to the power take-off unit on the rear of the tractor. The apparatus has the further advantage that wind drift or other accidental spraying of crops in other fields is avoided which occurs with conventional raised bars or by aircraft spraying.

Referring now to the drawings.

Figure 1:
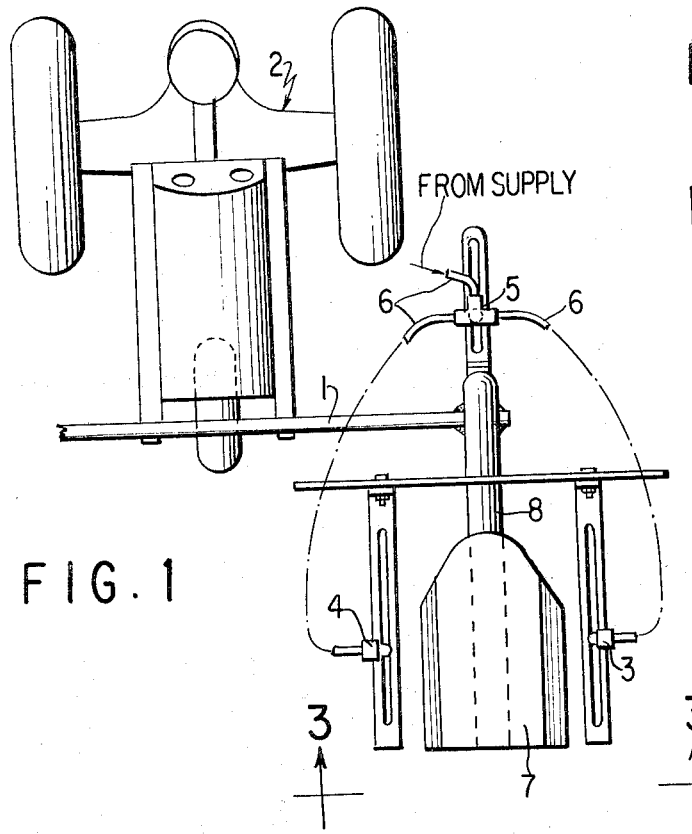
FIG. 1 is a partial plan view of an embodiment of the invention attached to a tractor.
Figure 2:
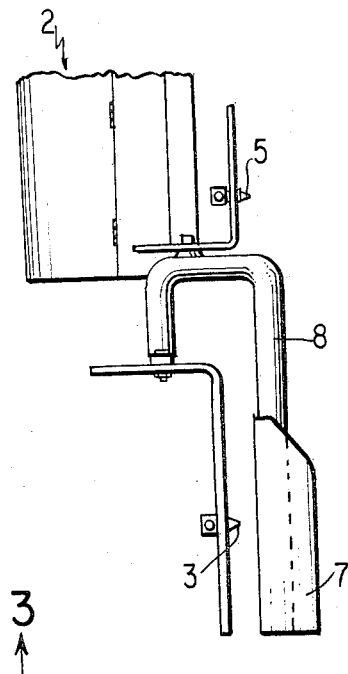
FIG. 2 is a side view in elevation of one arrangement of one group of the spray nozzles and shielding means.
Figure 3:
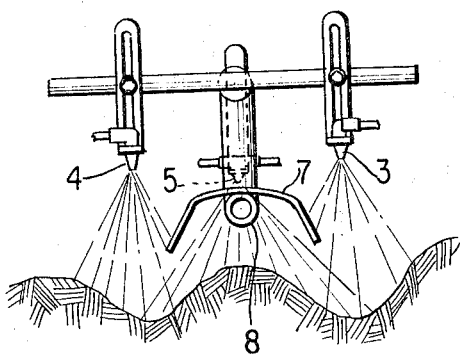
FIG. 3 is a front view in elevation of the spray nozzles and shielding means along the line 3—3.
Figure 4:
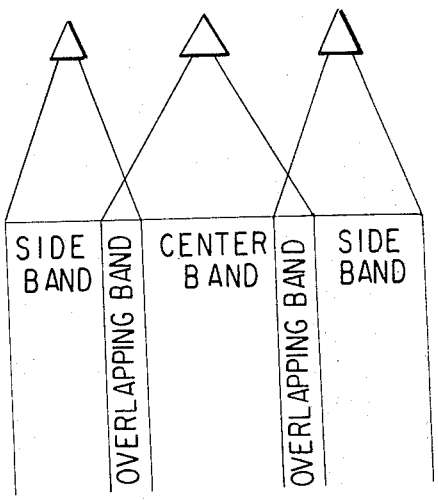
FIG. 4 is a diagram of the spray pattern from the embodiment of FIG. 1.

In the embodiment of FIGS. 1 to 3, the specific row applicator is attached to the hydraulic tool bar of tractor 2. Adjustably attached to the said bar are side nozzles 3 and 4 and center nozzle 5 which are connected to a supply of spray material under pressure by hose 6. While the center nozzle 5 is shown to be in back of the side nozzles, it can be in front of or in the same position as the side nozzles. The nozzle capacities will vary depending upon the herbicide and the crop being sprayed and the speed that the apparatus is moved across the field. Shielding means 7 on J-shaped arm 8, is between the side nozzles 3 and 4 and prevents their spray bands from over-lapping on the beneficial crop row as can be seen in FIG. 3, but the spray band of center nozzle 5 over-laps the spray bands of the side nozzles near the crop row to provide maximum herbicide protection adjacent to the crop row. FIG. 4 clearly shows the spray pattern in schematic form. The center is over the crop row and the side bands cover the area between the crop rows. In the area directly adjacent to the crop row, the side and center spray bands overlaps which gives a higher dosage of the herbicide in this hard to cultivate area.

Various modifications of the apparatus of the invention may be made without departing from the spirit or scope thereof and it is to be understood that the invention is to be limited only as defined in the appended claim.

I claim:

An apparatus for spraying row crops comprising a specific row applicator having a group of three spray nozzles connected to a source of spray material under pressure, the center nozzle being positioned over the row crop and the side nozzles being positioned on either side of the row crops and shielding means preventing the spray of the side nozzles from contacting the row crop but permitting over-lapping of the center spray band with the side spray bands.

References Cited by the Examiner

UNITED STATES PATENTS 1,188,131    6/1916    Agee _____ 239—150

ABRAHAM G. STONE, *Primary Examiner.*

R. E. BAGWILL, *Assistant Examiner.*